UNITED STATES PATENT OFFICE.

FRIEDRICH GUSTAV SAUER, OF BERLIN, GERMANY, ASSIGNOR TO PAUL HÖPFNER, OF SCHÖNEBERG-BERLIN, GERMANY.

PROCESS OF PRODUCING VINACEOUS BEVERAGES FROM PURE HEMOGLOBIN AND FERMENTABLE SUGAR.

No. 878,900.     Specification of Letters Patent.     Patented Feb. 11, 1908.

Application filed January 7, 1907. Serial No. 351,176.

*To all whom it may concern:*

Be it known that I, FRIEDRICH GUSTAV SAUER, a subject of the German Emperor, and a resident of Berlin, in the Kingdom of Prussia, Germany, have invented certain new and useful Improvements in Processes of Producing Vinaceous Beverages from Pure Hemoglobin and Fermentable Sugar, of which the following is a specification.

This invention has reference to a novel process of producing palatable vinaceous beverages from pure hemoglobin and fermentable sugar.

Heretofore processes were used for producing vinaceous beverages from saccharine liquids by fermenting them with barm and particularly wine yeast as well as the method of producing vinaceous drinks from saccharated blood serum. The latter process is deficient in that the products of the fermentation include, on the one hand, the serum albumin contained in the blood in rather large quantities which possesses a bad taste reminding of blood. On the other hand, these drinks are lacking the refreshing acid taste of wine. These deficiencies cannot be remedied by the addition of acids because they will coagulate the hemoglobin and produce a thick, lumpy, and unsightly liquid.

According to the present invention pure hemoglobin which has been carefully freed from every trace of serum and salts &c., is dissolved in suitable quantity of water. The solution thus obtained is saccharated by the addition of sugar which is fermentable, such as fruit sugar of which from $\frac{1}{8}$ to $\frac{1}{3}$ part of the total quantity of aqueous hemoglobin solution is added. Now the yeast or barm is introduced whereby the sugar is fermented and alcohol developed. Various kinds of yeast may be used according to the desired final product. During the last third of the period of fermentation there is added to the liquid a small amount of acid, preferably tartaric acid, required to impart a pleasant refreshing taste. When the fermentation is finished, the liquid is allowed to rest and finally a vinaceous drink is obtained whose color is at first a pure red which becomes browner later on and then shows the color of port wine. According to the barm or yeast used in the process, there will be obtained different kinds of vinaceous drinks just as is the case with the well known malt wines. If the acid is added before the fermentation commences, there will be produced a thick liquid of unpleasant taste whose odor resembles that of boiled beef. If the acid is added after the fermentation is finished, the liquid will become black and turbid.

When the finished product has been allowed to rest for some time and all the cells of the barm or yeast have settled down, an absolutely clear thin liquid is obtained which is exceedingly palatable and refreshing. It is distinguished by a large amount of ferrum albumin and consequently is a very refreshing and nourishing beverage. During the course of the fermentation the acid added does not change the hemoglobin to any extent as might have been expected.

Having thus described my invention I claim as new and desire to secure by Letters Patent:

The process of producing a palatable vinaceous beverage from pure hemoglobin and fermentable sugar consisting in dissolving pure hemoglobin in water, adding the fermentable sugar, introducing yeast, allowing the saccharine liquid to ferment, and adding a small quantity of tartaric acid during the third part of the period of fermentation.

In testimony whereof I have signed my name to this specification in the presence of two subscribing witnesses.

FRIEDRICH GUSTAV SAUER.

Witnesses:
   HENRY HASPER,
   WOLDEMAR HAUPT.